(12) United States Patent
Congedi et al.

(10) Patent No.: US 11,325,082 B2
(45) Date of Patent: May 10, 2022

(54) BLOWER UNIT FOR PNEUMATIC MIXERS AND APPARATUS FOR THE PNEUMATIC MIXING OF GRANULES, POWDERS AND/OR LIQUIDS COMPRISING SAID BLOWER UNIT

(71) Applicant: NTE HOLDING S.R.L., Gorgonzola (IT)

(72) Inventors: Massimo Congedi, Gorgonzola (IT); Emanuele Fratto, Gorgonzola (IT); Fabio Novelli, Gorgonzola (IT)

(73) Assignee: NOL-TEC EUROPE S.R.L., Gorgonzola (IT)

( * ) Notice: Subject to any disclaimer, the term of this patent is extended or adjusted under 35 U.S.C. 154(b) by 115 days.

(21) Appl. No.: 16/626,441

(22) PCT Filed: Jun. 14, 2018

(86) PCT No.: PCT/IB2018/054361
§ 371 (c)(1),
(2) Date: Dec. 24, 2019

(87) PCT Pub. No.: WO2019/003027
PCT Pub. Date: Jan. 3, 2019

(65) Prior Publication Data
US 2020/0129940 A1     Apr. 30, 2020

(30) Foreign Application Priority Data
Jun. 27, 2017   (IT) ......................... 102017000071761

(51) Int. Cl.
*B01F 33/40*     (2022.01)
*F16K 1/38*      (2006.01)
(Continued)

(52) U.S. Cl.
CPC .......... *B01F 33/4062* (2022.01); *B01F 23/59* (2022.01); *B01F 23/69* (2022.01); *B01F 33/409* (2022.01); *F16K 1/385* (2013.01)

(58) Field of Classification Search
CPC .............. B01F 13/0261; B01F 13/0266; B01F 13/0283; B01F 3/12; B01F 3/1271;
(Continued)

(56) References Cited

U.S. PATENT DOCUMENTS

| | | | | |
|---|---|---|---|---|
| 1,449,446 A | * | 3/1923 | Reed ........................ | B67D 7/42 137/542 |
| 2,084,546 A | * | 6/1937 | Ahlmann ............... | B65G 53/00 366/106 |

(Continued)

FOREIGN PATENT DOCUMENTS

| DE | 2522088 A1 | 11/1976 |
|---|---|---|
| DE | 202013102961 U1 | 7/2013 |
| DE | 102014204012 A1 | 9/2015 |

OTHER PUBLICATIONS

International Search Report dated Sep. 26, 2018 from counterpart PCT App PCT/IB2018/054361.

*Primary Examiner* — Tony G Soohoo
(74) *Attorney, Agent, or Firm* — Shuttleworth & Ingersoll, PLC; Timothy J. Klima

(57) ABSTRACT

A blower unit for pneumatic mixers, comprising: a hollow element internally defining a duct, extending between an input section and an output section, for the passage of an air flow between said sections, wherein said input section can be connected to a source of pressurised air and said output section can be connected to a manifold of a pneumatic mixer; a shutter suitable to shut off said airflow through said output section in a controlled manner; an actuator connected to the shutter and configured to regulate the position of the shutter; the hollow element has a first end portion, at said (Continued)

output section, that can be reversibly coupled to a corresponding end portion of the manifold and wherein the blower unit further comprises first reversible connecting means to establish a reciprocal connection between the end portions.

14 Claims, 4 Drawing Sheets

(51) Int. Cl.
*B01F 23/50* (2022.01)
*B01F 23/60* (2022.01)

(58) Field of Classification Search
CPC .. B01F 3/18; B01F 3/188; B01F 23/50; B01F 23/59; B01F 23/60; B01F 23/69; B01F 33/4061; B01F 33/4062; B01F 33/409; B01F 33/40; F16K 1/385; F16K 27/0254
See application file for complete search history.

(56) References Cited

U.S. PATENT DOCUMENTS

| | | | | |
|---|---|---|---|---|
| 3,386,182 | A * | 6/1968 | Lippert | F26B 3/0926 34/364 |
| 3,417,960 | A * | 12/1968 | Stehlin | F16K 31/143 251/14 |
| 3,550,625 | A * | 12/1970 | Adams, Jr. | F16K 27/02 137/614.2 |
| 3,949,963 | A * | 4/1976 | Aoki | F16K 27/02 251/63.6 |
| 4,261,389 | A * | 4/1981 | Hager | B01J 4/001 137/625.38 |
| 4,300,750 | A * | 11/1981 | Valka | F16K 37/0066 251/323 |
| 4,739,964 | A * | 4/1988 | Hutt | B65D 88/706 251/63.6 |
| 4,887,773 | A * | 12/1989 | Mehltretter | B02C 17/183 241/171 |
| 5,017,053 | A | 5/1991 | Sisk | |
| 5,853,071 | A * | 12/1998 | Robinson | B60T 11/30 188/352 |
| 5,988,867 | A * | 11/1999 | Sisk | B65G 53/16 222/195 |
| 6,007,234 | A * | 12/1999 | Steele | B65D 88/706 239/533.14 |
| 6,068,238 | A * | 5/2000 | Frank | B01J 4/001 251/144 |
| 6,237,893 | B1 * | 5/2001 | Rose | F16K 15/063 251/323 |
| 6,601,823 | B2 * | 8/2003 | Newberg | F16K 27/07 251/144 |
| 6,916,012 | B2 * | 7/2005 | Newberg | F16K 27/07 251/214 |
| 7,267,475 | B2 * | 9/2007 | Steele | B01F 3/18 366/101 |
| 9,541,201 | B2 * | 1/2017 | Frank | F16K 1/38 |
| 9,765,902 | B2 * | 9/2017 | Tiffany, III | B65D 88/706 |
| 10,464,742 | B2 * | 11/2019 | Tiffany, III | F16K 15/063 |
| 10,844,965 | B2 * | 11/2020 | Abouelleil | F16K 47/023 |
| 2015/0140184 | A1 * | 5/2015 | Fu | A23F 5/105 426/231 |
| 2020/0129940 | A1 * | 4/2020 | Congedi | B01F 3/188 |
| 2020/0315203 | A1 * | 10/2020 | Fratto | A23L 3/3409 |

* cited by examiner

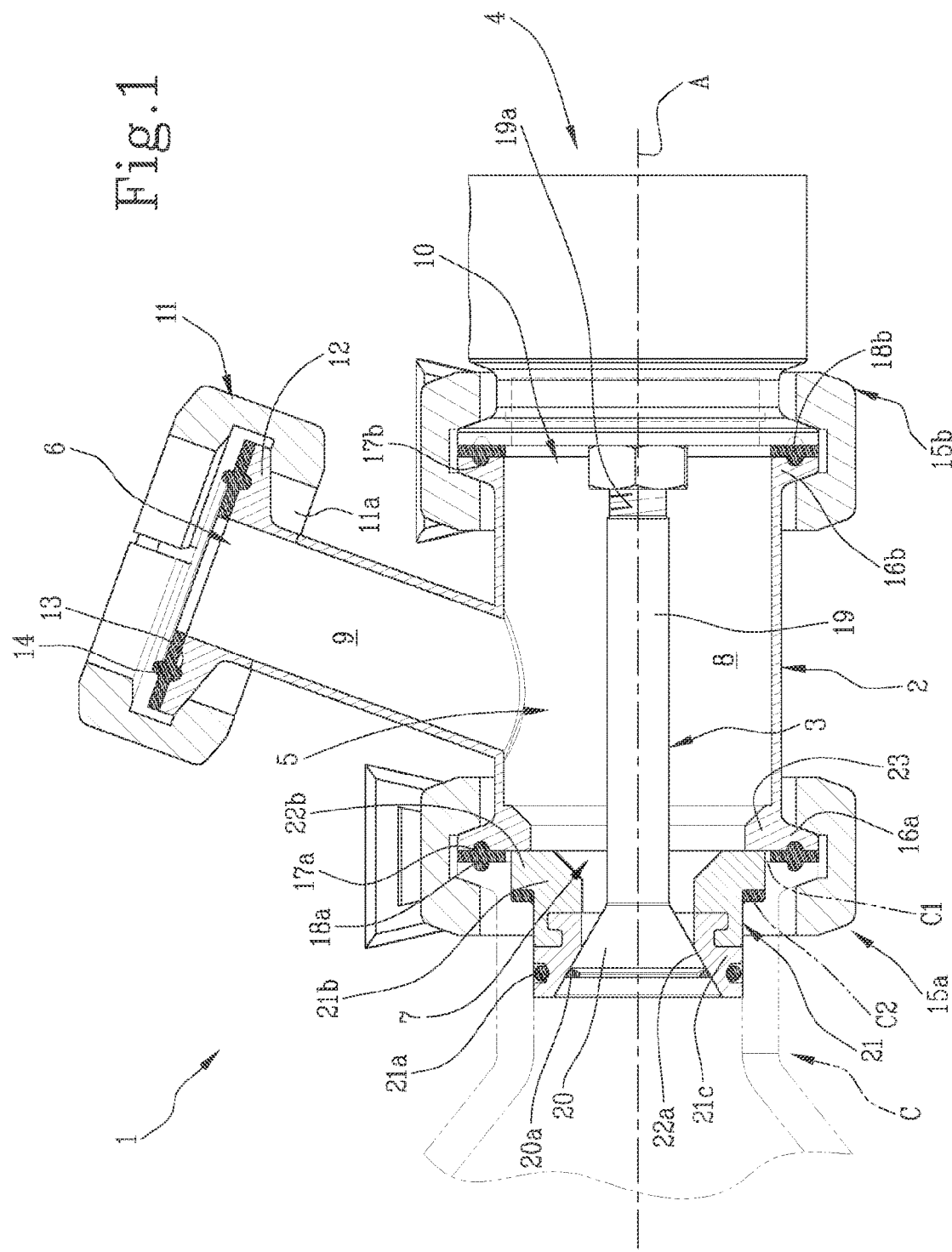

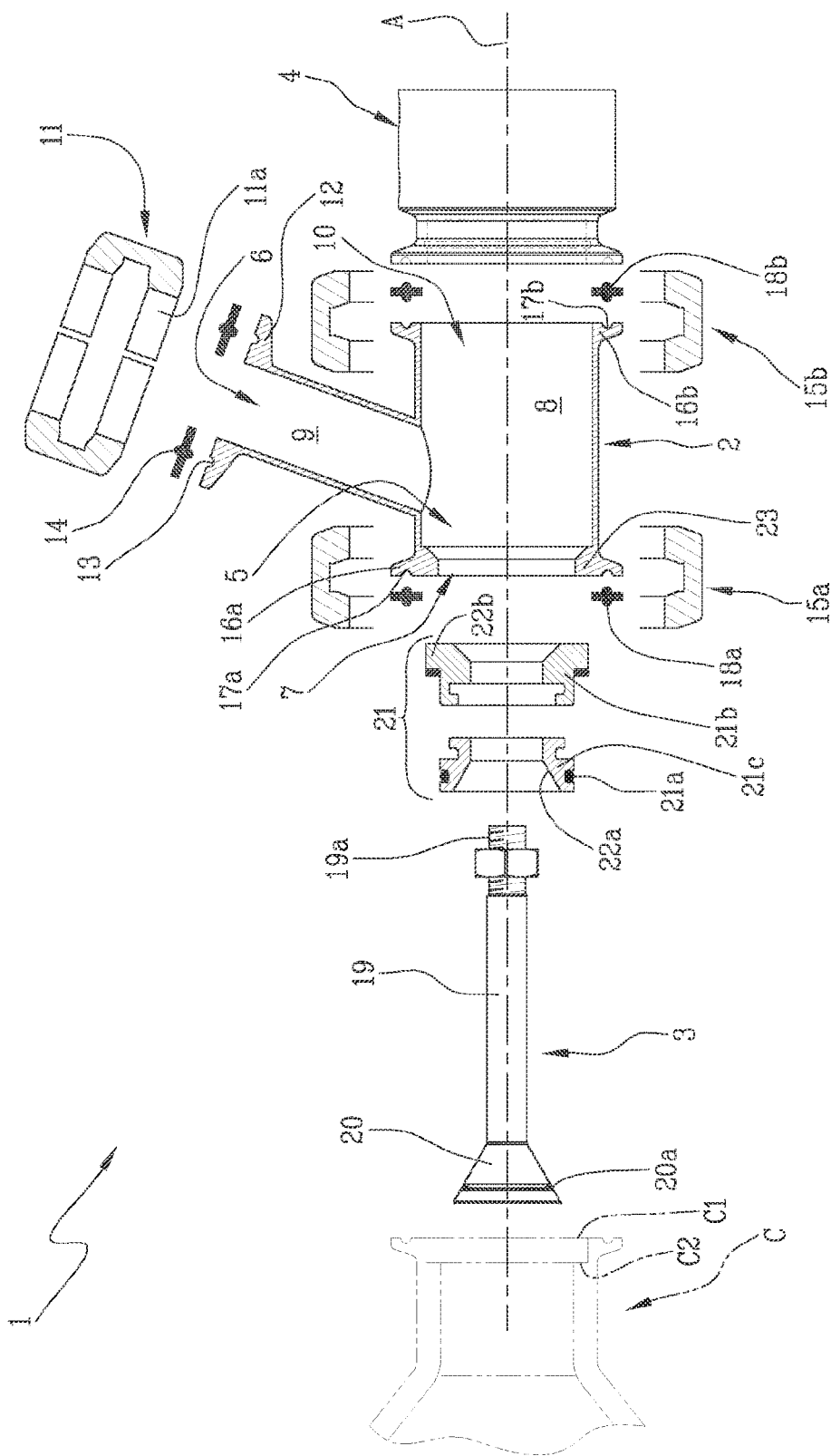

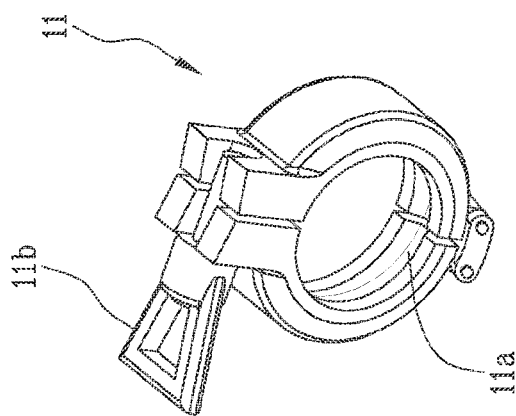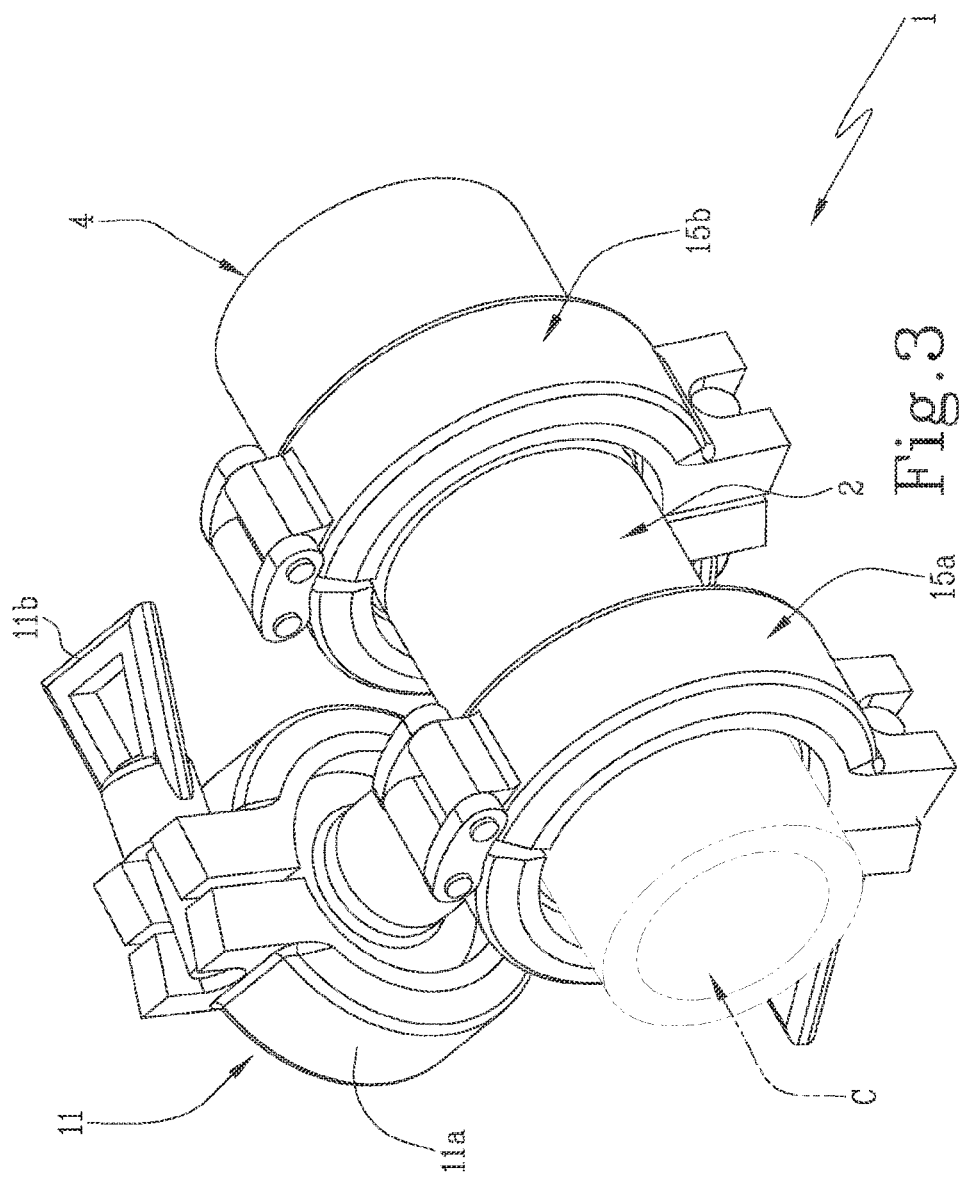

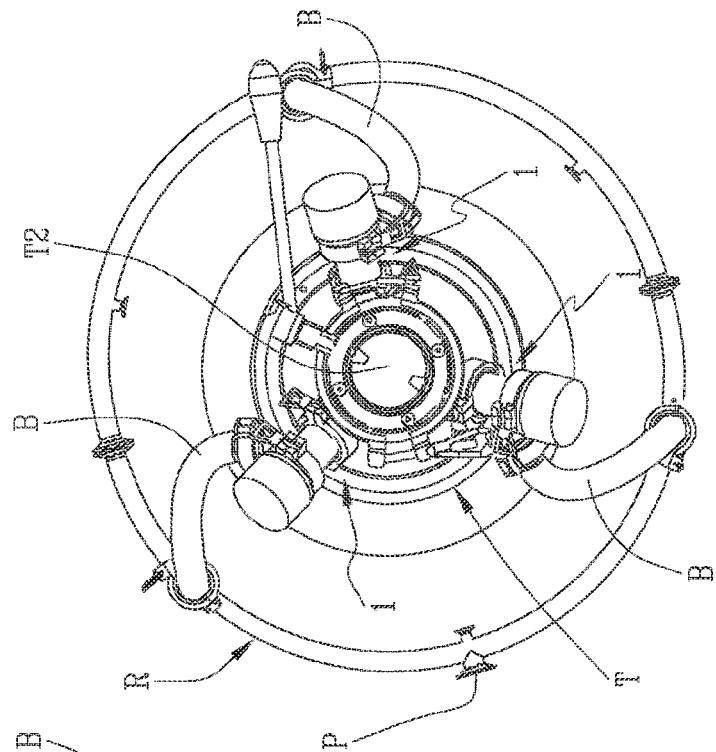
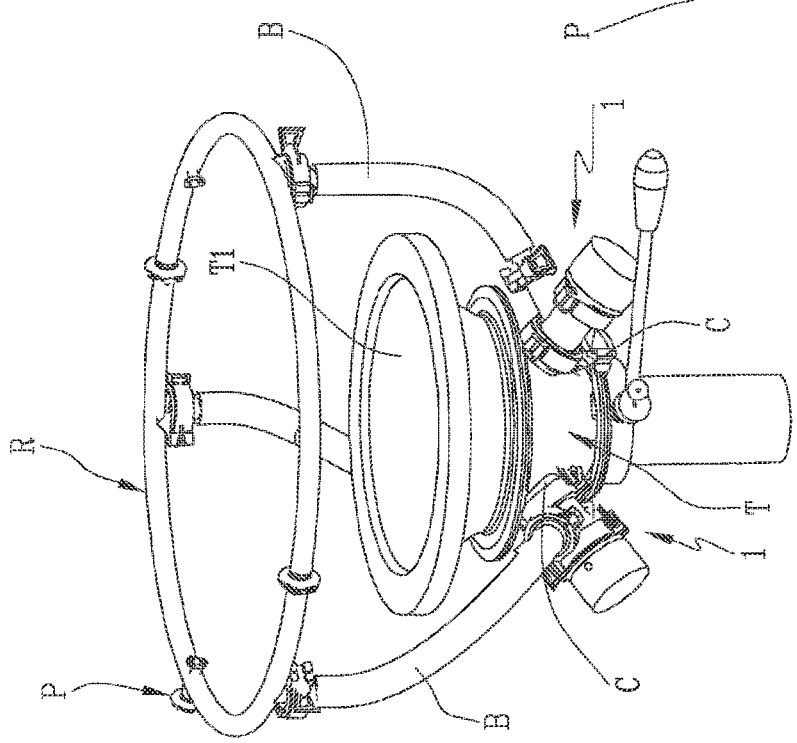

BLOWER UNIT FOR PNEUMATIC MIXERS AND APPARATUS FOR THE PNEUMATIC MIXING OF GRANULES, POWDERS AND/OR LIQUIDS COMPRISING SAID BLOWER UNIT

This application is the National Phase of International Application PCT/IB2018/054361 filed Jun. 14, 2018 which designated the U.S.

This application claims priority to Italian Patent Application No. 102017000071761 filed Jun. 27, 2017, which application is incorporated by reference herein.

The present invention relates to the field of industrial mixers for liquids and/or granular materials, in particular powders.

In particular, the present invention relates to a blower unit for the pneumatic mixing of liquids and/or granular materials, in particular powders, and an apparatus for the pneumatic mixing of granules and/or liquids comprising said blower unit.

Pneumatic apparatuses are known for the mixing of liquids and/or granular materials in which a hopper has the function of receiving the substances to be mixed; these are normally introduced through an opening in the upper part thereof. The outer surface of the hopper is connected to a plurality of blower units fed by one or more pressurized air ducts. The blower units comprise a shutter and an actuator to operate it and are angularly staggered on the outer surface of the hopper so as to provide a sufficiently spread blowing and stirring action throughout the mass of material contained in the hopper.

The mixing action is caused by impulsive airflows inside the hopper generated by the synergistic action of the pressurised air source and the blower units. "Impulsive airflows" is intended to mean airflows of particularly short duration and particularly high pressure, such as to cause stirring and mixing of the contents of the hopper.

It is known that in pneumatic mixing apparatuses the effectiveness and efficiency of the mixing action depends on the characteristics of the impulsive airflows and on the properties of the substances contained in the hopper, which define the physical response thereof to the aforesaid impulsive airflows. Properties of the substances contained in the hopper which define the physical response thereof to the impulsive airflows include: the weight of the various substances, the particle size of the granular matter, the presence of liquid substances and the viscosity of any liquid substances.

The characteristics of the impulsive airflows are determined by the properties of the mixing apparatus and the related pneumatic mixing process. The aforesaid properties therefore have a direct impact on the effectiveness and efficiency of the pneumatic mixing process and include, for example:

the duration of the impulsive airflows and of the intervals therebetween;
the pressure upstream of the shutter;
the number of blower units;
the direction along which the blower units blow inside the hopper;
the shape of the shutter inside the blower unit and of any stop surface shaped complementarily thereto;
the position and motion of the shutter, controlled by the actuator.

Disadvantageously, the integration between the hopper, blower units, and internal components of the blower units, actuators and delivery duct proposed by the prior art makes it impossible to quickly replace one or more of these components in order to obtain desired flow characteristics or for any repairs.

Currently, the adaptation of the mixing apparatus to operating conditions different from the design conditions and the repair of any damaged parts involve the replacement of entire parts of the hopper, in particular of the lower shell with all the blower units connected thereto and the actuators operating them.

Moreover, disadvantageously, the removal and replacement of the entire blower or of some parts thereof is complex, laborious and often only feasible by personnel with specific skills. Even the regulation of the blower's operating components cannot be implemented simply in terms of time and costs.

The foregoing compromises the ability to easily adapt the apparatus to the mixing of different substances depending on the case and to repair it if necessary; this drawback greatly restricts the conditions and effectiveness of use of a pneumatic mixing apparatus.

In this context, the technical task underlying the present invention is to provide a blower unit for pneumatic mixers, as well as an apparatus for the pneumatic mixing of granules, powders and/or liquids comprising such a blower, which overcome the above-mentioned drawbacks of the prior art.

In particular, it is an object of the present invention to provide a blower unit for pneumatic mixers, which is capable of improving the versatility of the pneumatic mixing apparatus. This improvement relates to one or more of the following characteristics: the machine downtime during an intervention to replace one or more internal components, the possibility to replace certain internal components with equivalents having different characteristics, the level of technical specialisation required of the personnel in charge of the adaptation intervention, the possibility of the user of the apparatus to carry out the adaptation intervention with internal or own resources, without contacting specialized external personnel.

The specified technical task and object are substantially achieved by means of a blower unit for pneumatic mixers and an apparatus for the pneumatic mixing of granules, powders and/or liquids including such a blower unit, comprising the technical features set out in one or more of the accompanying claims.

Further features and advantages of the present invention will become apparent from the indicative, and therefore non-limiting description of a preferred, but not exclusive, embodiment of a blower unit for pneumatic mixers and an apparatus for the pneumatic mixing of granules, powders and/or liquids including such a blower, as illustrated in the accompanying drawings wherein:

FIG. 1 shows, partially in section and partially in view, a blower unit for pneumatic mixers according to the present invention;

FIG. 2 is an exploded view of the blower unit in FIG. 1;

FIG. 3 is a perspective view of the blower unit in FIG. 1;

FIG. 3A shows a detail of the blower unit in FIG. 1;

FIG. 4 is a perspective view of a pneumatic mixing apparatus according to the present invention;

FIG. 5 is a view of the mixing apparatus of FIG. 4 from a different angle.

With reference to FIGS. 1, 2 and 3, the blower unit object of the invention is generally indicated by 1, and its main components are: a hollow element 2, a shutter 3 and an actuator 4 connected to the shutter 3 to regulate the position thereof, i.e. to regulate the maximum travel thereof understood as a shift from a closed condition of the shutter to a maximum opening position, which can be predefined, as will be better specified below.

The hollow element 2, preferably having a monolithic structure, is a body internally defining a manoeuvring volume for housing the shutter 3 and for the passage of the mixing air. In particular, the hollow element 2 internally defines a duct 5, shown in FIGS. 1 and 2, configured for the passage of a flow of air or other inert gases between an input section 6 and an output section 7.

The hollow element 2 internally defines a chamber 8, in which the shutter 3 is slidably arranged so as to translate along an axis of translation "A" thereof, and a lateral delivery duct 9 extending between the input section 6 and the chamber 8 in a direction preferably incident to the axis of translation "A" of the shutter 3.

The chamber 8 extends between a rear region 10 of the hollow element 2, to which the actuator 4 is applied, and the aforesaid output section 7. In some embodiments, the chamber 8 has a rotationally symmetric, preferably cylindrical shape. In the illustrated example, the symmetry axis of the chamber 8 coincides with the translation axis "A" of the shutter.

The hollow element 2 can be connected to a source of pressurised air at the input section 6. In the illustrated embodiment, the lateral duct 9, preferably of circular cross-section, has the function of establishing a flow connection between the pressurised air source and the chamber 8.

Preferably, the connection between the hollow element 2 and the pressurised air source is carried out by means of removable connecting members 11. In this case, the hollow element 2 has, at the input section 6, an ending 12, which can be reversibly coupled, for example, to a corresponding ending (not shown) of a duct for supplying pressurised air "B". In at least one embodiment, the ending 12 has the shape of a flange.

According to the configuration shown in FIG. 1, the duct 5 is defined by the lateral duct 9 and a portion of the chamber 8, in particular a front portion thereof facing the output section 7.

Still more preferably, the ending 12 has a seat 13 for housing a gasket 14, which is adapted to seal the connection between the ending 12 of the hollow element 2 and the above-mentioned ending of the supply duct "B". In at least one embodiment, the removable connecting members 11 comprise tightening mechanisms, which are configured to cause the ending 12 and the corresponding ending of the supply duct "B" to move towards one another. In particular, in the embodiment illustrated in the accompanying figures, the removable connecting members 11 comprise a tightening ring 11a (visible in detail in FIG. 3A), which can be tightened by means of a threaded knob 11b.

Advantageously, the hollow element 2 can also be reversibly connected to a manifold "C" (identified as the hidden line in FIGS. 1, 2 and 3) of a pneumatic mixer at the output section 7 by means of first reversible connecting means 15a. The aforesaid manifold "C" defines a protrusion of the pneumatic mixer, in particular of the lower part of a hopper "T" of the mixing apparatus, and has the function of connecting the blower unit 1 to the hopper "T".

The hollow element 2 has, at the output section 7, a first end portion 16a that can be reversibly coupled to a corresponding end portion "C1" of the manifold "C". In at least one embodiment, the first end portion 16a of the hollow element 2 and/or the end portion "C1" of the manifold "C" have the shape of a flange.

Preferably, the first end portion 16a has a first seat 17a for housing a first gasket 18a adapted to seal the connection between the hollow element 2 and the manifold "C" of the pneumatic mixer.

Still more preferably, the first reversible connecting means 15a comprise first tightening means configured to cause the first end portion 16a and the manifold "C" to move towards one another so as to compress said first gasket 18a. In the embodiment illustrated in the accompanying figures, the first reversible connecting means 15a comprise a ring, which can be tightened by means of a threaded knob, similar to that shown in FIG. 3A.

With reference to the shutter 3, it has the shape of a piston comprising an elongated rod 19 and a flared or tapered head portion 20, preferably in the shape of a truncated cone. In at least one embodiment of FIGS. 1 and 2, the shutter 3 has a rotation symmetry axis. In the embodiment of FIGS. 1 and 2, the rotation symmetry axis of the shutter coincides with its translation axis "A".

The shutter 3 can be connected to the actuator 4 and positioned so as to shut off the airflow through the output section 7 in a controlled manner.

In particular, an abutment element 21, having at least one internal stop surface 22a, is arranged in opposition to the shutter 3. The internal stop surface 22a, preferably with a truncated cone or convergent shape, is counter-shaped with respect to the head portion 20 of the shutter to define at least one hermetically closed configuration of the output section 7.

The position of the shutter 3, controlled by the actuator 4, defines the opening and closing of a flow connection between the chamber 8 and the hopper "T" of the pneumatic mixing apparatus to which the blower unit 1 is connected through said manifold "C". Furthermore, the possible intermediate positions of the shutter 3 can define the size of the passage section of the flow connection. In particular, the size of the aforesaid section is defined by the position of the head portion 20 of the shutter 3 with respect to the internal stop surface 22a.

Advantageously, in order to be able to determine the intermediate positions of the shutter 3, i.e. the travel of the shutter during the opening phase, adjustment means are arranged inside the actuator 4 to define the width of the output section 7.

These adjustment means may either be of the manual type, for a variation in the output section 7 made by manual intervention on mechanical components of the actuator 4, or of the automatic type, by means of a suitable electronic system, which operates on the actuator 4 under certain conditions.

The adjustment means therefore allow the flow to be controlled with an "additional" parameter with respect to the ON/OFF pressure and time parameters alone (opening and closing of the output section 7), i.e. a control parameter representative of the width of the fluid passage section.

Advantageously, this parameter is thus controlled (as adjusted by manual or automatic intervention) independently of parameters of pressure and opening time of the output section (7).

The adjustment means therefore allow the parameter representative of the width of the passage section to be operated on, thus optimizing the flow and adjusting it according to the type of material to be mixed, i.e. according to the chemical nature of the material and the particle size of the powders.

Therefore, on the basis of each single mixing step, the individual flow control parameters are suitably adjusted in an independent manner in order to mix the powders in an optimal manner.

Preferably, the head portion 20 of the shutter 3 includes fluid-sealing means, in particular at least one gasket 20a. The gasket 20a is configured to seal said flow connection when the head portion 20 abuts against the internal stop surface 22a of the abutment element 21.

The respective shapes of the head portion 20 of the shutter 3 and of the internal stop surface 22a and the position of the shutter can determine the characteristics of the flow of air flowing into the hopper "T" through the manifold "C". Advantageously, the shutter 3 and/or the abutment element 21 are removable and replaceable so that they can be selected according to the desired type of flow.

In particular, the connection between the shutter 3 and the actuator 4 is reversible. In the illustrated embodiment, the rod 19 comprises an externally threaded end portion forming a screw 19a, which can be screwed into a corresponding receiving portion of the actuator 4.

Moreover, the abutment element 21 can be removed and/or replaced by disassembling the reversible connection between the blower unit 1 and the manifold "C". In particular, the locking of the abutment element 21 is achievable by closing the first reversible connecting means 15a so that, when tightened, the abutment element 21 remains trapped between the manifold "C" and the hollow element 2.

In some embodiments, the abutment element 21, when in use, is housed inside the manifold "C". Preferably, the abutment element 21 has an outer surface that is shaped complementarily to the internal surface of the manifold "C". Still preferably, the abutment element 21 also comprises fluid-sealing means, in particular at least one gasket 21a, to define a fluid-tight housing inside said manifold "C".

In the illustrated embodiment, at least one segment 22b of the abutment element 21 has an increased radial dimension and is inserted in a corresponding increased diameter segment of the manifold "C", which extends from the end portion "C1" of the manifold "C", facing the hollow element 2, up to an internal shoulder "C2". In turn, the hollow element 2 has, on the output section 7, an internal projection 23 such as to intercept and axially lock the abutment element 21 which, once assembled, remains locked at its increased diameter portion between said internal projection 23 and said internal shoulder "C2".

In accordance with a different embodiment, not shown, the internal projection 23 may be defined by an inside diameter of the hollow element 2 (and in particular of the output section 7) suitably selected to axially lock the abutment element 21.

In some embodiments, the abutment element 21 comprises a rear body 21b and a front body 21c, preferably joined by mutual interlocking. In particular, the rear body 21b comprises the above-described portion of the abutment element 21 configured for the locking between the internal projection 23 and the internal shoulder "C2", whereas the front body 21c comprises the internal stop surface 22a.

In one embodiment not expressly shown in the figures, at least one of the two bodies 21b, 21c is made of two complementary pieces, for example in the form of two half-rings, to promote mutual assembly with and disassembly from the other of the two bodies 21b, 21c.

In an alternative embodiment, not shown, the abutment element 21 can alternatively be housed and locked, partially or totally, with the same procedures described above, inside the hollow element 2.

In accordance with a further aspect of the invention, the actuator 4 can be reversibly connected to the rear region 10 of the hollow element 2, by means of second reversible connecting means 15b. Preferably, the hollow element 2 has, at said rear region 10, a second end portion 16b that can be reversibly coupled to a corresponding end surface of the actuator 4. In at least one embodiment, the coupling between the hollow element 2 and the actuator 4 is achieved by juxtaposing respective flanges.

Preferably, at least one from among the actuator 4 and the second end portion 16b of the hollow element 2 is provided with a second seat 17b for housing a second gasket 18b, said second reversible connecting means 15b being configured to cause the actuator 4 and the second end portion 16b of the hollow element 2 to move towards one another so as to compress said second gasket 18b. In the embodiment illustrated in the accompanying figures, the second reversible connecting means 15b comprise a tightening ring, which can be tightened by means of a threaded knob, similarly to what is shown in FIG. 3A.

Preferably, the actuator 4 is of the linear type, in particular of the pneumatic type.

In the embodiment illustrated in FIGS. 1 and 2, the actuator 4 is configured to cause the shutter 3 to translate along the axis "A".

In possible alternative embodiments, not shown, the shutter 3 and the abutment element 4 can be positioned so as to shut off the input section 6 or an intermediate section of the duct 5 in a controlled manner.

Still in possible alternative, non-shown embodiments of the blower unit 1, the actuator 4 is of the rotary type. In this case, the shutter 3 and the abutment element 21 form a rotary valve configured to shut off the flow in the duct 5 in a controlled manner.

In other embodiments, not shown, the actuator 4 and preferably also the shutter 3 are removable and/or replaceable, whereas the connection between the hollow element 2 and the manifold "C" or the connection between the hollow element 2 and the pressurised air source is fixed.

FIG. 4 shows an apparatus for the pneumatic mixing of granules, in particular powders or granules and liquids, made in accordance with the present invention, comprising: a hopper "T", adapted to contain granules and/or liquids and provided, on an outer surface thereof, with a plurality of protrusions forming manifolds "C"; a plurality of blower units, of the type indicated by 1 in FIGS. 1, 2 and 3, which can be connected to said manifolds "C", and at least one pressurised air supply system.

The hopper "T" preferably has a shape converging downwards. It is suitable to receive the material to be mixed from an opening "T1" in the upper part and to deliver it through an openable-on-command hole "T2" in the lower part.

In some embodiments, not shown, a metering system is connected or can be connected to the lower part of the hopper "T". The function of said metering system is to ensure the controlled discharge of the material contained inside the hopper "T".

The manifolds "C" are of the type described above, preferably with a circular cross-section, similar to the manifold "C" shown by the dashed line in FIGS. 1, 2 and 3. They are suitable to be reversibly connected to the blower units 1 with the means and the methods described above and to define a flow connection between the aforementioned blower units 1 and the inside of the hopper "T".

The pressurised air supply system comprises a plurality of supply ducts "B" that can be connected, preferably in a reversible manner, to the input section 6 of the blower units 1 with the means and the methods described above.

In some embodiments, the pressurised air supply system comprises an intake "P", which can be connected to a pressurised air source external to the pneumatic mixing apparatus.

In other embodiments, not shown, the pressurised air supply system also includes a compressor, acting as a source of pressurised air.

In the embodiment of FIGS. 4 and 5, the pressurised air supply system also includes a common line "R" adapted to distribute the pressurised air to the individual supply ducts "B"; preferably, the aforementioned common line "R" has an annular shape. Still preferably, the aforesaid supply ducts "B" can be reversibly connected to the common line "R", in particular by means of tightening rings similar to those described above and illustrated in FIG. 3A.

In some embodiments, the materials of the blower unit 1 and mixing apparatus, except the ga´skets, are metal alloys, preferably steels and in particular corrosion-resistant steels. Some minor components, such as the shutter 3 and the counterhead 21, are preferably made of polymeric materials for greater lightness and practicality.

The invention claimed is:

1. A blower unit for pneumatic mixers of granules, powders and/or liquids, comprising:
    a hollow element internally defining a duct, extending between an input section and an output section, for the passage of an air flow between said sections, wherein said input section is configured to be detachably connected to a source of pressurized air and said output section is configured to be detachably connected to a manifold of a pneumatic mixer of granules, powders and/or liquids;
    an abutment element positioned at the output section and including a stop surface defining an output flow passage, the stop surface having a truncated cone or convergent shape, the stop surface extending an entirety of a circumference of the outlet flow passage, and the abutment element being removable from and replaceable to the hollow element;
    a shutter having a head portion movable through the output flow passage in a controlled manner between a closed position and a fully open position, the head portion having a shape corresponding to the shape of the stop surface to define a flow area of the output flow passage between the stop surface and the head portion and to interact with the stop surface to provide for a hermetically closed configuration of the output flow passage in the closed position to shut off said air flow through said output section;
    an actuator connected to the shutter and configured to adjust a travel of the shutter to regulate the position of the head portion with respect to the stop surface and thereby regulate the flow area of the output flow passage;
    wherein said hollow element has a first end portion, at said output section, that is configured to be detachably coupled to a corresponding end portion of said manifold;
    a first detachable connector configured to establish a reciprocal connection between the first end portion of the hollow element and a corresponding second end portion of said manifold.

2. The blower unit as claimed in claim 1, wherein said first end portion of said hollow element includes a first seat for housing a first gasket, said first detachable connector being configured to cause the first end portion of the hollow element and the second end portion of said manifold to move towards one another so as to compress said first gasket.

3. The blower unit as claimed in claim 1, wherein said actuator is detachably connected to a second end portion of said hollow element, and wherein said blower unit further comprises a second detachable connector configured to connect the hollow element and the actuator.

4. The blower unit as claimed in claim 3, wherein at least one chosen from said actuator and second end portion of the hollow element includes a second seat for housing a second gasket, said second detachable connector being configured to cause said actuator and second end portion of the hollow element to move towards one another so as to compress said second gasket.

5. The blower unit as claimed in claim 1, wherein said first and/or second detachable connectors include tightening rings.

6. The blower unit as claimed in claim 1, wherein the actuator is detachably connected to the shutter.

7. The blower unit as claimed in claim 1, wherein the actuator is a pneumatic linear actuator.

8. The blower unit as claimed in claim 1, wherein the shutter is shaped as a piston with a truncated cone-shaped head portion and a rod extending from said head portion in a direction of the actuator.

9. The blower unit as claimed in claim 1, wherein the hollow element is a monolithic block extending between said first end portion of the hollow element and the second end portion of said manifold, wherein said first end portion and said second end portion are arranged in a reciprocally opposite position along an axis of translation of said shutter, and wherein said hollow element also has a lateral delivery duct extending from said input section in a direction incident to the axis of translation of said shutter.

10. The unit as claimed in claim 1, wherein said actuator is configured for manually and/or automatic actuation to define a control parameter representative of the flow area of the output flow passage and controllable independently of parameters of pressure and opening time of the output section.

11. An apparatus for the pneumatic mixing of granules, or granules and liquids, comprising:
    a hopper suitable to contain granules and/or liquids and provided, on an outer surface thereof, with a plurality of manifolds defining respective internal ducts in fluid connection with an interior of said hopper;
    a plurality of blower units for pneumatic mixers, each detachably connected to a respective one of said manifolds;
    at least one pressurized air supply system detachably connected to said blower units;
    wherein each blower unit comprises:
        a hollow element internally defining a duct, extending between an input section and an output section, for the passage of an air flow between said sections, wherein said input section is configured to be detachably connected to the pressurized air supply system and said output section is configured to be detachably connected to the respective one of the manifolds;
        an abutment element positioned at the output section and including a stop surface defining an output flow passage, the stop surface having a truncated cone or convergent shape, the stop surface extending an entirety of a circumference of the outlet flow passage, and the abutment element being removable from and replaceable to the hollow element;

a shutter having a head portion movable through the output flow passage in a controlled manner between a closed position and a fully open position, the head portion having a shape corresponding to the shape of the stop surface to define a flow area of the output flow passage between the stop surface and the head portion and to interact with the stop surface to provide for a hermetically closed configuration of the output flow passage in the closed position to shut off said air flow through said output section; an actuator connected to the shutter and configured to adjust a travel of the shutter to regulate the position of the head portion with respect to the stop surface and thereby regulate the flow area of the output flow passage;

wherein said hollow element has a first end portion, at said output section, that is configured to be detachably coupled to a corresponding end portion of said manifold;

a first detachable connector configured to establish a reciprocal connection between the first end portion of the hollow element and the corresponding end portion of the respective one of the manifolds.

12. The apparatus as claimed in claim 11, wherein said abutment element has an outer surface that is counter-shaped with respect to the internal duct of the manifold and/or to said output section, and further comprising a fluid seal to define a fluid-tight housing inside said internal duct of the manifold and/or of said output section.

13. The apparatus as claimed in claim 12, wherein the abutment element has a segment with an increased radial dimension, said segment being configured to be inserted in a corresponding segment of the internal duct of the manifold and/or of the duct inside the hollow element having an increased inside diameter, delimited on one side by an internal shoulder of the manifold and on the other side by an internal projection of the hollow element, so as to bring about an axial locking of said increased diameter segment between said internal shoulder of the manifold and said internal projection of the hollow element.

14. The apparatus as claimed in claim 11, wherein said plurality of blower units comprises at least two types of blower units each having a different shape and/or configuration of the hollow element, the shutter and/or the actuator.

* * * * *